United States Patent Office 3,644,516
Patented Feb. 22, 1972

---

3,644,516
TRICHLOROPHOSPHONOGUANIDINES
Fawzy G. Sherif, Cherry Hill, N.J., assignor to E. I. du Pont de Nemours and Company, Wilmington, Del.
No Drawing. Filed July 31, 1969, Ser. No. 846,581
Int. Cl. C07f 9/25
U.S. Cl. 260—543 P    2 Claims

ABSTRACT OF THE DISCLOSURE

Trichlorophosphonoguanidines of the general formula $$(H_2N)_n-\underset{\underset{NH\cdot(HCl)_n}{\|}}{C}-(N=PCl_3)_{2-n}$$

in which $n=0$ or 1, which are useful for extending molecules having active hydroxyl or amine (NH) groups, as phosphorylating intermediates to prepare amidophosphoric esters and the like.

BACKGROUND

Cellulosic fabrics such as cotton and rayon are known to have by themselves poor resistance to burning in air. When a flame is applied to cellulosic fabrics while dry, they catch fire and quickly burn to ashes. This invention relates to novel trichlorophosphonoguanidines which are useful as fire-retarding agents in such cellulosic fabrics or as intermediates for preparing fire-retarding agents as described below.

BRIEF SUMMARY OF THE INVENTION

Trichlorophosphonoguanidines of the general formula $$(H_2N)_n-\underset{\underset{NH\cdot(HCl)_n}{\|}}{C}-(N=PCl_3)_{2-n}$$

in which $n$ is 0 or 1.

DETAILED DESCRIPTION OF THE INVENTION

This invention relates to novel trichlorophosphonoguanidine compounds having the formula $$(H_2N)_n-\underset{\underset{NH\cdot(HCl)_n}{\|}}{C}-(N=PCl_3)_{2-n}$$

wherein $n$ is zero or one.

These new compounds can be prepared by reacting guanidine or guanidine hydrochloride (preferably guanidine hydrochloride) with phosphorus pentachloride. Hydrogen chloride is evolved during the preparation. The reaction temperature requires control. Room temperature (about 25° C.) is a preferred temperature, but higher temperatures short of 50° C. can also be used. At above 50° C., the reaction products start to polymerized and cannot be isolated. The use of a diluent in the reaction simplifies control of the reaction temperature. Low boiling (50° C.–85° C.) solvents such as chloroform and 1,2-dichloroethane are useful diluents. Further, withdrawal of HCl as formed lowers the reaction temperature.

The reactions, starting from the preferred guanidine hydrochloride, can be illustrated as follows:

(I)

$$\begin{array}{c}NH_2\\|\\C=NH\cdot HCl\\|\\NH_2\end{array} + PCl_5 \longrightarrow \begin{array}{c}N=PCl_3\\|\\C=NH\cdot HCl\\|\\NH_2\end{array} + 2HCl$$

and (II)

$$\begin{array}{c}NH_2\\|\\C=NH\cdot HCl\\|\\NH_2\end{array} + 2PCl_5 \longrightarrow \begin{array}{c}N=PCl_3\\|\\C=NH\\|\\N=PCl_3\end{array} + 5HCl$$

Compound (II) can of course also be prepared from Compound (I) and an additional mole of phosphorus pentachloride.

As seen above, the molar ratio of reactants is a strong factor in determining the main product of reaction. When the reactants are mixed in the theoretical proportions indicated by the above equations and then allowed to react, the desired product is produced in essentially theoretical amounts. Mixtures of (I) and (II) can be prepared by the use of $PCl_5$ to guanidine reactant ratios between 1:1 and 2:1.

Infrared spectra of compounds (I) and (II), and the assignment of selected absorption bands in the spectra in cm.$^{-1}$ units are shown below:

| (I) | (II) | Assignment |
|---|---|---|
| 3,200s [1] | | N–H stretch. |
| 3,020s | [2] 3,020m | Imino=NH. |
| 1,640s | | N–H deformation. |
| 1,510s | 1,510s | CN stretch. |
| 1,300s | 1,300s | P=N. |
| 850s | 855s | Nonassigned. |

[1] Strong.  [2] Medium.

The novel trichlorophosphonoguanidines react rapidly with water, alcohols and enolizing ketones such as acetone and methyl ethyl ketone, with the evolution of hydrogen chloride. Accordingly, the reaction to make them and their storage thereafter should be with the exclusion of water vapor. Otherwise the compounds will convert by reaction with water to corresponding phosphonic acids which may be illustrated by the following reaction:

$$(H_2N)_n-\underset{\underset{NH\cdot(HCl)_n}{\|}}{C}-(N=PCl_3)_{2-n} \xrightarrow{H_2O} (H_2N)_nN-\underset{\underset{NH\cdot(HCl)_n}{\|}}{C}-[NHP(OH)_2]_{2-n}$$

The novel compounds of this invention can be reacted in cellulosic fibers (such as cotton and rayon) to produce enhanced fire-retardancy in such fibers. The compounds are also useful to extend molecules having active hydroxyl or amine (NH) groups.

In use, these compounds react at sites bearing active hydrogens with the evolution of hydrogen chloride. In many uses it is sufficient to remove the evolved HCl as a gas. In other uses such as on cellulosics, it may be preferred to use these compounds in the presence of an anhydrous acid binder such as a tertiary amine like pyridine or triethylamine.

These novel compounds are also useful (as more fully described in my co-pending application Ser. No. 846,594, filed July 31, 1969, OR–5023–A) phosphorylating intermediates for preparing amidophosphoric esters by reaction with suitable aliphatic hydroxy compounds and enolic ketones, particularly to prepare esters of the formula $$(H_2N)_n-\underset{\underset{NH\cdot(HCl)_n}{\|}}{C}-\left[NH-\underset{\underset{O}{\|}}{P}(OR)_2\right]_{2-n}$$

where $n$ is 0 or 1 and R can be an aliphatic radical. Such esters produce flame-retardancy in air on cotton and rayon fabrics.

EXAMPLES

The following examples illustrate the invention and are not intended to be in limitation thereof.

Unless otherwise stated, the parts expressed are by weight.

EXAMPLE 1

In a moisture-protected stirred reaction vessel, 95.5 parts (1 mole) guanidine hydrochloride and 416.5 parts (2 moles) phosphorus pentachloride were added to 1200 parts chloroform. The mixture was stirred and warmed until, at 40° C., hydrogen chloride gas started to evolve. As formed, this gas was removed. The mixture was then stirred at 25° C. until the solids went into solution. Four hours were required. 15.7 parts acetonitrile was added to the mixture, followed by 66 parts n-hexane, and the mixture was left for an hour. Crystals of product separated out. The crystals had a melting point of 131° C. The product was soluble in chloroform, acetonitrile and dichloroethane. It was insoluble in carbon tetrachloride, benzene, n-hexane, ethyl ether and petroleum ether. It reacted rapidly with water, acetone and alcohols with the evolution of hydrogen chloride; when left in open air, it evolved hydrogen chloride.

Analysis of the product gave the following results:

Calculated as $CHN_3P_2Cl_6$ (percent): C, 3.64; H, 0.30; N, 12.74; P, 18.78; Cl, 64.51. Found (percent): C, 3.80; H, 0.53; N, 12.48; P, 17.95; Cl, 63.71.

The infrared spectrum and the $P^{31}$ nuclear magnetic resonance spectrum of the compound indicated its structure to be

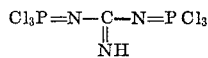

EXAMPLE 2

In a moisture-protected stirred reaction vessel, 19.1 parts (0.2 mole) guanidine hydrochloride and 41.6 parts (0.2 mole) phosphorus pentachloride were added to 300 parts chloroform. The mixture was stirred and warmed until at 40° C. hydrogen chloride gas started to evolve. As formed, this gas was pumped off. Stirring was continued for three hours at 25° C. until all solids went into solution and the evolution of gas ceased.

The solution was filtered to remove a few milliparts of impurities. The filtrate had two layers, and acetonitrile was added in a minor amount to cause the two layers to become one. Excess ether was added and the mixture was agitated. A crystalline white product formed. It was filtered in a closed system and washed with acetonitrile.

The isolated crystals were insoluble in chloroform, acetonitrile, carbon tetrachloride and benzene. Their melting point was 115° C.

Analysis of the crystals indicated the product to be

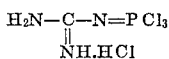

The infrared spectrum and the $P^{31}$ nuclear magnetic resonance spectrum of the compound indicated its structure to be as shown. Its analysis was as follows:

Calculated as $CH_4N_3Cl_4P$ (percent): C, 5.20; H, 1.74; N, 18.20; P, 13.42; Cl, 61.43. Found (percent): C, 5.35; H, 1.31; N, 18.48; P, 14.35; Cl, 60.90.

EXAMPLE 3

95.5 parts guanidine hydrochloride and 416.5 parts phosphorus pentachloride were reacted in 1200 parts chloroform as in Example 1. The reacted mass was then externally ice-cooled. During two hours, ice-cooled 600 parts trifluoroethyl alcohol were added dropwise to the reacted mass. The mixture was then refluxed for 16–18 hours. Gases, including hydrogen chloride, were evolved during reflux, some of which were condensed in an ice bath cooled trap. The condensed gas had the infrared spectrum and boiling point of 1,1,1-trifluoro-2-chloroethane.

When no more hydrogen chloride was evolved, the reaction mass was distilled to remove chloroform, leaving a viscous oil. This oil was heated at 80° C.–100° C. under vacuum to remove traces of chloroform and hydrogen chloride. This product was a transparent heavy oil, obtained in almost quantitative yield. Analysis of this oil showed:

Calculated as $C_9H_{11}O_6N_3F_{12}P_2$ (percent): Carbon, 19.75; hydrogen, 2.02; nitrogen, 7.68; phosphorus, 11.32; halogen, 41.66. Found (percent): Carbon, 19.63; hydrogen, 2.30; nitrogen, 8.93; phosphorus, 10.12; halogen, 41.87.

This compound was soluble in chloroform and in acetonitrile. It boiled at 300° C. without decomposition.

The infrared spectrum and the $P^{31}$ nuclear magnetic resonance spectrum of this compound indicated its structure to be

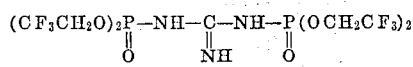

EXAMPLE 4

The procedure of Example 3 was followed except that 360 parts n-propyl alcohol were used instead of the trifluoromethyl alcohol. Ice-condensed gases from the n-propyl alcohol reaction had the infrared spectrum and boiling point of n-propyl chloride. The product was a transparent heavy oil having the following analysis:

Calculated as $C_{13}H_{31}O_6N_3P_{12}$ (percent): C, 40.30; H, 8.06; N, 10.84; P, 15.99. Found (percent): C, 34.55; H, 7.59; N, 10.65; P, 17.08.

This product was soluble in chloroform and in methanol. It could be heated at 225° C. at atmospheric pressure or at 100° C. under vacuum without decomposition.

The infrared spectrum and the $P^{31}$ nuclear magnetic resonance spectrum of this compound indicated its structure to be

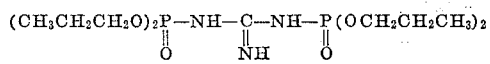

EXAMPLE 5

A cotton fabric was soaked in a 5% by weight solution of the product of Example 3 in chloroform, withdrawn and dried at 100° C. The treated fabric was exposed to a direct flame for two seconds. Only the edges of the fabric charred and the flame at the edges of the fabric self-extinguished as soon at the fabric was removed from the flame. When a like cotton fabric was similarly treated and exposed to a direct flame for 30 seconds, it charred slowly, stayed intact and did not ash. No after-glow occurred in either treated fabric.

A similar cotton fabric without treatment was exposed to similar direct flame for 2 seconds. The fabric caught the flame and turned to ashes.

EXAMPLE 6

Flame-retarding test 18 parts of the product from Example 4 were dissolved in 27 parts N,N-dimethylformamide.

A 5 inch by 10 inch strip of cotton twill was padded in the solution and squeezed in a roller. It was dried 3 minutes at 130° C. and then cured 3 minutes at 165° C. The gain in weight by the fabric at this point was 26%. The fabric was not discolored and it was very soft.

The treated fabric was spread in a vertical plane and supported along its vertical edges. The spread fabric was positioned in a transparent column open only at the top. The top of the column was six or more inches above the spread fabric. The interior of the column was provided with an upward flow from its base of a gaseous mixture of pure oxygen and pure nitrogen. The volume flow rate of each gas making up the mixture was instrumented and manually adjustable.

With gas mixture flowing, the top of the spread fabric was ignited from the top. The flow rates of the oxygen and nitrogen were adjusted until the flame on the ignited fabric just went out. The ratio of the volume flow of oxygen to the sum of the volume flows of oxygen and nitrogen at this point was then determined. This value, called the limiting oxygen index or LOI, was 0.325 for this fabric.

When identical fabric was treated with a solution of 9 parts of the product of Example 3, in 36 parts dimethylformamide in similar fashion, the fabric gained 12% in weight. That sample gave an LOI of 0.289.

Identical fabric untreated gave an LOI of 0.180.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Trichlorophosphonoguanidines of the formula

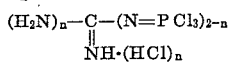

wherein $n$ is zero or one.

2. The compound of claim 1 wherein $n$ is zero.

References Cited

Sherif. J. Inorg. & Nucl. Chem. 1968 (7), pp. 1707–1714.

LORRAINE A. WEINBERGER, Primary Examiner

E. J. GLEIMAN, Assistant Examiner

U.S. Cl. X.R.

117—136; 260—959